(No Model.)

H. SEARLE.
PROCESS OF MAKING A REVERSED PROFILE PATTERN OF THE HUMAN FACE.

No. 339,334. Patented Apr. 6, 1886.

WITNESSES:
Allan R. Searle.
Albert Doughty

INVENTOR:
Henry Searle

UNITED STATES PATENT OFFICE.

HENRY SEARLE, OF WASHINGTON, DISTRICT OF COLUMBIA.

PROCESS OF MAKING A REVERSED PROFILE-PATTERN OF THE HUMAN FACE.

SPECIFICATION forming part of Letters Patent No. 339,334, dated April 6, 1886.

Application filed December 29, 1885. Serial No. 187,063. (No model.)

*To all whom it may concern:*

Be it known that I, HENRY SEARLE, a citizen of the United States, residing at Washington, District of Columbia, have invented a certain new and useful Improved Process of Making a Reversed Profile-Pattern of the Human Face; and I do hereby declare that the following is a full, clear, and exact description of the invention, which will enable others skilled in the art to which it appertains to make and use the same.

The use of the pattern is to assist in making a likeness of the person.

Figure 1:
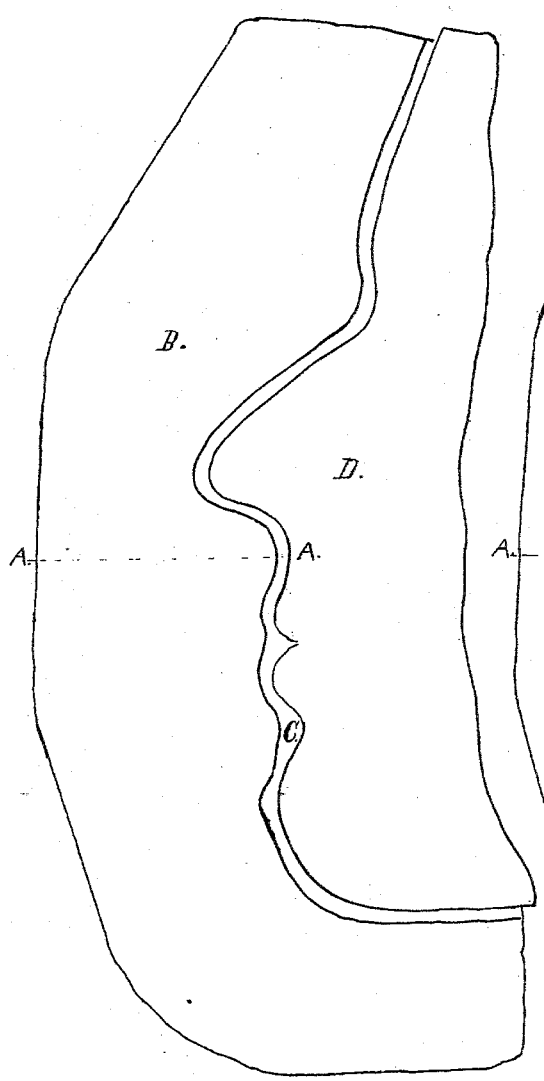
Figure 2:
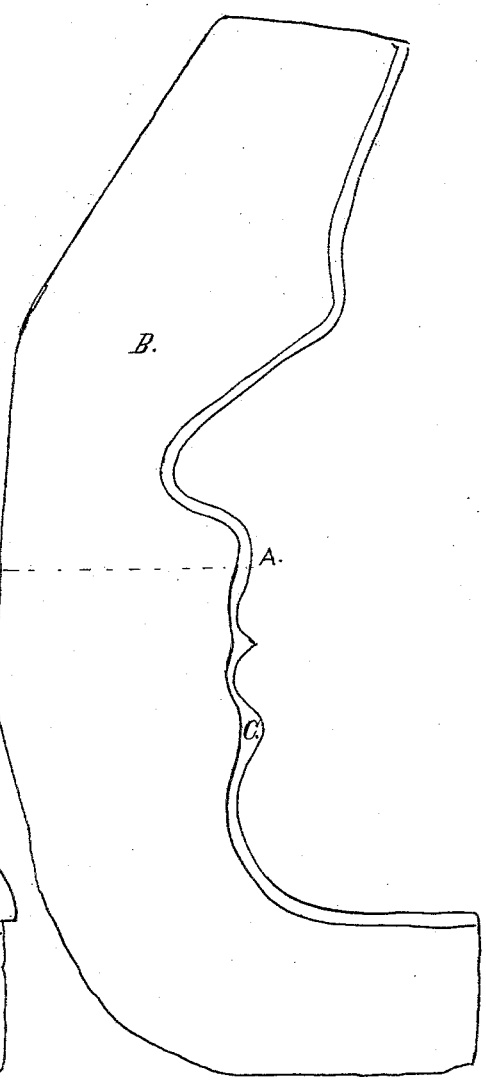
Figure 3:
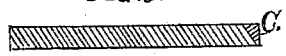

I will describe the process by referring to the accompanying drawings, in which Figure 1 shows the pattern applied to the face. Fig. 2 shows the pattern completed and removed, and Fig. 3 shows a section through *a a*, Fig. 2.

Similar letters of reference indicate corresponding parts in all the figures where they occur.

I provide a plate of a half-inch (more or less) thickness, made of plaster or any suitable material, as shown by B, Figs. 1 and 2. I cut the plate so as to nearly fit the outline of the face D, Fig. 1, then cause the subject to sit quietly in a natural position with the head at rest, and hold the approximate profile in such position as to nearly touch the outline of the face. I then, by a spectula or other convenient tool, fill the space between the plate and the face with fresh-mixed plaster or other material that will set or harden. The soft plaster takes the shape of the face exactly, and adheres to the edge of the plate B, as shown in Fig. 3. When the plate is removed, the edge of the plate presents a perfect counterpart profile of the face, as shown, B, Fig. 2.

I apply the pattern to any plastic material used for modeling or to any surface for making a drawing, or in any manner for the purpose of making a likeness.

Having fully described my invention, what I desire to claim and secure by Letters Patent is—

The within-described process of making a counterpart profile-pattern by introducing soft material between an approximate counterpart and the face and causing it to harden and adhere, all substantially as and for the purposes herein specified.

HENRY SEARLE.

Witnesses:
ALLAN R. SEARLE,
ALBERT DOUGHTY.